United States Patent Office 3,479,354
Patented Nov. 18, 1969

3,479,354
DERIVATIVES OF 5-HYDROXYQUINOXALINE-1,4-DIOXIDE
Ronald Hilson Begg Galt, Macclesfield, England, assignor to Imperial Chemical Industries Limited, London, England, a corporation of Great Britain
No Drawing. Filed Feb. 19, 1968, Ser. No. 706,650
Claims priority, application Great Britain, Mar. 21, 1967, 13,252/67
Int. Cl. C07d 51/78; A61k 27/00
U.S. Cl. 260—250                        4 Claims

ABSTRACT OF THE DISCLOSURE

Novel 5 - hydroxyquinoxaline - 1,4 - dioxide derivatives which possess antibacterial and growth promoting activity.

---

This invention relates to new heterocyclic compounds and more particularly it relates to new quinoxaline derivatives which possess antibacterial and growth promoting activity.

According to the invention I provide quinoxaline derivatives of the formula:

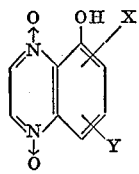

(I)

wherein X and Y, which may be the same or different, stand for hydrogen or halogen atoms, or for hydroxy radicals, alkoxy radicals of not more than 6 carbon atoms, or acylamino radicals containing not more than 10 carbon atoms, and the salts thereof with bases.

As a suitable value for X or Y when it stands for a halogen atom there may be mentioned, for example, a chlorine or bromine atom, and as a suitable value for X or Y when it stands for an alkoxy radical of not more than 6 carbon atoms there may be mentioned, for example, the methoxy radical.

As a suitable value for X or Y when it stands for an acylamino radical containing not more than 10 carbon atoms there may be mentioned, for example, an alkylcarbonylamino, alkylsulphonylamino, or arylsulphonylamino radical containing not more than 10 carbon atoms, especially an alkylcarbonylamino or alkylsulphonylamino radical containing not more than 5 carbon atoms, or an arylsulphonylamino radical containing not more than 10 carbon atoms, for example an acetylamino, methanesulphonylamino or p-toluenesulphonylamino radical.

As a suitable salt with a base there may be mentioned, for example, a sodium or potassium salt.

A preferred group of quinoxaline derivatives of the invention comprises those quinoxaline derivatives wherein X is in position 6 of the quinoxaline nucleus and Y is in position 8 of the quinoxaline nucleus, and an especially preferred group of quinoxaline derivatives of the invention comprises those quinoxaline derivatives wherein X is in position 6 and stands for a hydrogen or a halogen atom, and Y is in position 8 and stands for a hydrogen atom or a halogen atom, or for a hydroxy radical, an alkoxy radical of not more than 6 carbon atoms or an acylamino radical containing not more than 10 carbon atoms.

Specific quinoxaline derivatives of the invention are, for example, 5-hydroxy-, 5-hydroxy-8-methoxy-, 6,8-dibromo-5-hydroxy-, 8-chloro-5-hydroxy-, 6,8-dichloro-5-hydroxy-, 8-acetylamino-5-hydroxy-, 5,8-dihydroxy-, 6 - chloro - 5 - hydroxy-, 5-hydroxy-8-p-toluenesulphonyl-amino-, and 5-hydroxy-8-methanesulphonylaminoquinoxaline-1,4-dioxide, and their salts with bases.

According to a further feature of the invention, we provide a process for the manufacture of the quinoxaline derivatives of the invention which comprises the oxidation of a quinoxaline derivative of the formula:

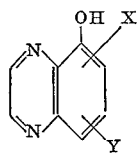

II wherein X and Y have the meanings stated above.

As a suitable oxidising agent there may be mentioned, for example, a peracid, for example m-chloroperbenzoic acid. The oxidation may be carried out in the presence of an inert diluent or solvent, for example benzene, and it may be conveniently carried out at ambient or elevated temperature.

According to a further feature of the invention, we provide a process for the manufacture of the quinoxaline derivatives of the invention which comprises the dealkylation of a compound of the formula:

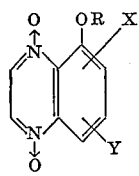

III wherein X and Y have the meanings stated above, and R stands for a straight-chain alkyl radical of not more than 6 carbon atoms.

A suitable value for R is, for example, the methyl radical.

As a suitable dealkylating agent there may be mentioned, for example, a halide of a metal which is classified in Group III or Group IVb of the Periodic Table, for example aluminum trichloride, aluminum tribromide or boron trichloride. The dealkylation may be carried out in an inert diluent or solvent, for example benzene or methylene dichloride, and it may be carried out at or below ambient temperature. A preferred temperature range is −50° C. to 20° C.

According to a further feature of the invention we provide a process for the manufacture of those of the quinoxaline derivatives of the invention wherein X or Y stands for a halogen atom which comprises the halogenation of a compound of the formula:

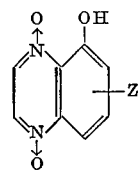

IV wherein Z stands for a hydrogen or a halogen atom, or a hydroxy radical an alkoxy radical of not more than 6 carbon atoms, or an acylamino radical containing not more than 10 carbon atoms.

The halogenation may be carried out by the use of an elemental halogen, for example chlorine or bromine, in the presence of an inert diluent or solvent, for example acetic acid, or by the use of an N-halosuccinimide, for example N-chlorosuccinimide, in an inert diluent or solvent, for example methylene dichloride. The use of an elemental halogen is preferred for the preparation of a quinoxaline derivative, wherein both X and Y stand for halogen atoms, by halogenation of a compound of Formula IV wherein Z stands for hydrogen. The use of an N-halosuccinimide, is preferred for the preparation of a quinoxaline derivative wherein only one of X and Y stands for a halogen atom, for example, a compound wherein X stands for a hydrogen atom and Y stands for a halogen atom.

The compounds of the Formulae II and III used as starting materials in the above processes may be obtained by the condensation of a diamine of the formula:

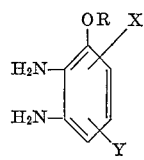

wherein R, X and Y have the meanings stated above, with glyoxal or a derivative thereof, for example glyoxal bisulphite, followed by either dealkylation of the product to give a compound of Formula II, or oxidation of the product to give a compound of the Formula III.

As stated above, the quinoxaline derivatives of the invention possess antibacterial activity, for example they are active in vitro against *Staphylococcus aureus, Salmonella dublin, Streptococcus pyogenes, Pseudomonas aeruginosa* and *Proteus vulgaris,* and they are also active in vivo against the above organisms when dosed orally or parenterally.

The quinoxaline derivatives of the invention also possess growth promoting activity, for example when administered to domestic animals, for example chickens, in their food, they cause an increase in the body weight of the animals in a given time which is greater than that shown by a control group of animals whose food does not contain a quinoxaline derivative of the invention.

According to a further feature of the invention I provide pharmaceutical and veterinary compositions which comprise at least one of the quinoxaline derivatives of the invention and a pharmaceutically acceptable diluent or carrier.

The compositions may be in a form suitable for oral administration, for example tablets, capsules, solutions or suspensions, or, in the case of veterinary compositions, in the form of a medicated foodstuff or premix suitable for dilution with an animal foodstuff to provide a medicated foodstuff.

The pharmaceutical compositions may also be in a form suitable for parenteral administration, for example sterile injectable solutions or suspensions.

The compositions may contain conventional excipients, and may be prepared by the application of conventional techniques.

The quinoxaline derivatives of the invention may be used in conjunction with known antibacterial agents, for example tetracyclines, penicillins, fusidic acid or sulphonamides, and they may be used for veterinary purposes in conjunction with other known growth promoting agents, for example, chlorotetracycline or penicillin.

The invention is illustrated but not limited by the following examples:

EXAMPLE 1 m-Chloroperbenzoic acid (14 g.) is added to a solution of 5-hydroxyquinoxaline (0.05 g.) in benzene (2.5 ml.), and the solution is kept at ambient temperature for 18 hours. Ethyl acetate (10 ml.) is added, and the solution is washed three times, twice with 10 ml. of a saturated aqueous solution of sodium bicarbonate, and once with 5 ml. of water. The organic layer is dried with anhydrous sodium sulphate, and then the solvents are evaporated. The residual solid is crystallised from ethyl acetate, and there is thus obtained 5-hydroxyquinoxaline-1,4-dioxide, M.P. 234° C. (decomposition).

EXAMPLE 2 m-Chloroperbenzoic acid (14 g.) is added to a solution of 5-hydroxy-8-methoxyquinoxaline (4 g.) in benzene (250 ml.), and the mixture is allowed to stand at ambient temperature for 18 hours. The solution is washed twice, each time with 100 ml. of a saturated aqueous solution of sodium bicarbonate. The combined sodium bicarbonate solutions are acidified with 3 N-hydrochloric acid solution and then extracted with chloroform (250 ml.). The organic layer is dried over anhydrous sodium sulphate, and the solvent is evaporated. The residual solid is crystallised from chloroform, and there is thus obtained 5-hydroxy-8-methoxyquinoxaline - 1,4 - dioxide, M.P. 186–189° C.

The 5-hydroxy-8-methoxyquinoxaline used as starting material is prepared as follows:

A mixture of 5,8-dimethoxyquinoxaline (3 g.), dimethylformamide (50 ml.) and sodium thiophenoxide (2.2 g.) is refluxed for 30 minutes, and the cooled red solution is poured into water (500 ml.). The aqueous solution is adjusted to pH 7 with 3 N-hydrochloric acid, and then extracted with chloroform (500 ml.). The chloroform layer is washed with water (200 ml.), and is then extracted with a 15% aqueous solution of sodium hydroxide. The aqueous layer is acidified to about pH 6 with dilute hydrochloric acid, and then extracted with chloroform. The organic layer is dried over anhydrous sodium sulphate and the solvent evaporated. The residue is crystallised from a mixture of chloroform and light petroleum (B.P. 60–80° C.), and there is thus obtained 5-hydroxy-8-methoxyquinoxaline, M.P. 122–125° C.

EXAMPLE 3

A solution of bromine (0.28 ml.) in glacial acetic acid (5 ml.) is added dropwise to a stirred solution of 5-hydroxyquinoxaline-1,4-dioxide (0.4 g.) in glacial acetic acid (15 ml.), and the solution is stirred for two hours. The yellow solid which precipitates is filtered off, washed with water and dried. The solid (0.5 g.) is crystallised twice from ethyl acetate, and there is thus obtained 6,8-dibromo-5-hydroxyquinoxaline-1,4-dioxide, M.P. 204–206° C. (decomposition).

EXAMPLE 4

N-chlorosuccinimide (0.375 g.) is added to a solution of 5-hydroxyquinoxaline-1,4-dioxide (0.25 g.) in methylene dichloride (50 ml.), and the solution is allowed to stand at ambient temperature for two days. The solvent is evaporated, and the residual mixture is recrystallised four times from acetone-light petroleum. There is thus obtained 8-chloro-5-hydroxyquinoxaline-1,4-dioxide, M.P. 206–207° C. (decomposition).

EXAMPLE 5

Chlorine gas is bubbled into a solution of 5-hydroxyquinoxaline-1,4-dioxide (0.5 g.) in methylene dichloride (100 ml.) at ambient temperature for ten minutes. The solvent is evaporated, and the residue recrystallised from acetone-light petroleum. There is thus obtained 6,8-dichloro-5-hydroxyquinoxaline-1,4-dioxide, M.P. 195–197° C. (decomposition).

EXAMPLE 6

A few drops of boron trichloride, precooled to −30° C., are added to a stirred solution of 8-acetylamino-5-methoxyquinoxaline-1,4-dioxide (0.08 g.) in methylene dichloride (10 ml.) cooled to −50° C. The temperature of the dark purple solution is allowed to rise to 20° C. (ca. 30 minutes), and then water (10 ml.) is added. The organic layer is separated, and the aqueous layer extracted with methylene dichloride (10 ml.). The methylene dichloride extracts are combined, washed with water (10 ml.) and dried over anhydrous magnesium sulphate. The solvent is evaporated, and the residue recrystallised from chloroform. There is thus obtained 8-acetylamino- 5-hydroxyquinoxaline-1,4-dioxide, M.P. 230–231° C. (decomposition).

The 8-acetylamino-5-methoxyquinoxaline-1,4-dioxide used as starting material is prepared as follows:

8-acetylamino-5-methoxyquinoxaline is oxidised with m-chloroperbenzoic acid by the general method described in Example 1, except that instead of being extracted with sodium bicarbonate solution, the benzene solution is filtered from precipitated m-chlorobenzoic acid and applied to a column of alumina (Woelm, grade III, neutral) and eluted with increasing concentrations of chloroform in benzene. The fraction eluted with 100% chloroform is crystallised from chloroform-light petroleum (B.P. 60–80° C.) to give 8-acetylamino-5-methoxyquinoxaline-1,4-dioxide, M.P. 182–185° C.

EXAMPLE 7

5-hydroxy-8-ethoxyquinoxaline-1,4-dioxide, prepared as described in Example 1, is demethylated with boron trichloride by the general procedure described in Example 6. There is thus obtained 5,8-dihydroxyquinoxaline-1,4-dioxide, M.P. 233–234° C. (decomposition).

EXAMPLE 8

6-chloro-5-methoxyquinoxaline-1,4-dioxide (0.1 g.) is demethylated with boron trichloride by the general method described in Example 6. There is thus obtained 6-chloro-5-hydroxyquinoxaline-1,4-dioxide, M.P. 202–204° C. (decomposition), crystallised from ethyl acetate.

The 6-chloro-5-methoxyquinoxaline-1,4-dioxide used as starting material is prepared as follows:

5-chloro-4-methoxybenzofuroxan (5 g.) in ethyl acetate (50 ml.) is reduced with hydrogen and platinum oxide at two atmospheres pressure. The catalyst is filtered off, and the filtrate is evaporated to give a residue consisting essentially of 4-chloro-3-methoxy-1,3-phenylenediamine. This residue is dissolved in water (120 ml.), glyoxal bisulphite (10 g.) is added, and the mixture is heated at 100° C. for two hours. The cooled solution is adjusted to pH 9 with 3 N-sodium hydroxide solution and extracted with chloroform. The organic layer is washed with water, dried over anhydrous magnesium sulphate, and the solvent is evaporated. The residue is crystallised from methanol, and there is thus obtained 6-chloro-5-methoxyquinoxaline, M.P. 115° C. This quinoxaline is oxidised with m-chloroperbenzoic acid by the general method described at the end of Example 6 except that the product is eluted from the alumina column with a 50% solution of chloroform in benzene. The eluate is evaporated and the residue is crystallised from chloroform-light petroleum to give 6-chloro-5-methoxyquinoxaline-1,4-dioxide, M.P. 204–206° (decomposition).

EXAMPLE 9

5-methoxy-8-p-toluenesulphonylaminoquinoxaline-1,4-dioxide is demethylated with boron trichloride by the general procedure described in Example 6. The product is crystallised from chloroform-light petroleum, and there is thus obtained 5-hydroxy-8-p-toluenesulphonylaminoquinoxaline-1,4-dioxide, M.P. 215–218° C. (decomposition).

The 5-methoxy-8-p-toluenesulphonylaminoquinoxaline-1,4-dioxide is prepared as follows:

p-Toluenesulphonyl chloride (0.8 g.) is added to a solution of 8-amino-5-methoxyquinoxaline (0.75 g.) in dry pyridine (30 ml.), and the mixture is allowed to stand at ambient temperature for two days. The mixture is poured into 3 N-hydrochloric acid containing ice, and the mixture is extracted with ethyl acetate. The ethyl acetate extract is washed with 3 N-hydrochloric acid and water, and then dried over anhydrous magnesium sulphate. The solvent is evaporated, and the residue is crystallised from ethyl acetate-light petroleum. There is thus obtained 5-methoxy-8-p-toluenesulphonylaminoquinoxaline, M.P. 170–171° C. This quinoxaline is oxidised with m-chloroperbenzoic acid by the general procedure described in the second part of Example 6, and the product is eluted from the alumina column with a 60% solution of chloroform in benzene. The eluate is evaporated and the residue is crystallised from ethyl acetate-light petroleum to give 5-methoxy-8-p-toluenesulphonylaminoquinoxaline-1,4-dioxide, M.P. 230–235° C. (decomposition).

EXAMPLE 10

8-methanesulphonylamino-5-methoxyquinoxaline-1,4-dioxide is demethylated with boron trichloride by the general method described in Example 6. The product is crystallised from acetone-light petroleum, and there is thus obtained 5-hydroxy-8-methanesulphonylaminoquinoxaline-1,4-dioxide, M.P. 211—214° C.

The starting material for this demethylation is prepared by repeating the process described in Example 9 except that methanesulphonylchloride is used instead of p-toluenesulphonyl chloride. The product is recrystallised from ethyl acetate, and there is thus obtained 8-methanesulphonylamino-5-methoxyquinoxaline, M.P. 171–173° C., which is oxidised with m-chloroperbenzoic acid as described in the second part of Example 6. The product is eluted from the alumina column with a 60% solution of chloroform in benzene. The eluate is evaporated and the residue is crystallised from acetone-light petroleum to give 8-methanesulphonylamino-5-methoxyquinoxaline-1,4-dioxide which is used directly in the next stage.

EXAMPLE 11

5-hydroxyquinoxaline-1,4-dioxide (0.05 g.) is dissolved in water (5 ml.) and 0.1 N-sodium hydroxide solution (2.8 ml.) is added. The solution is evaporated to small bulk (0.25 ml.), and acetone (10 ml.) is added. The sodium salt which separates is isolated by filtration, M.P. >330° C.

EXAMPLE 12

A quinoxaline derivative of the invention is mixed with an inert diluent (lactose or kaolin), and is granulated with a binding agent (gelatine solution, starch paste, or acacia mucilage). A disintegrating agent (maize starch, diatomite or alginic acid) is mixed with the granules, and a lubricating agent (stearic acid or talc) is also added. The mixture is compressed into tablets according to the known art and there are obtained tablets containing, for example 250 mg. of active ingredient, which are suitable for oral administration for therapeutic purposes.

The composition of a typical tablet is as follows:

| | Mg. |
|---|---|
| 5-hydroxyquinoxaline-1,4-dioxide | 250 |
| Lactose | 220 |
| Maize starch | 25 |
| 10% aqueous gelatine solution | 5 |
| Stearic acid | 3 |

EXAMPLE 13

The following is a typical formulation to provide capsules according to standard pharmaceutical techniques:

| | Mg. |
|---|---|
| 5-hydroxyquinoxaline-1,4-dioxide | 250 |
| Lactose | 27 |
| Stearic acid | 3 |

The ingredients are passed through a 60 mesh sieve, and then mixed together for 15 minutes. The mixture is filled into gelatine capsules. Each capsule contains 280 mg. of the mixture corresponding to 250 mg. of active ingredient.

EXAMPLE 14

A typical premix composition for use in the preparation of a medicated foodstuff suitable for feeding to chickens has the composition:

| | Gms. |
|---|---|
| 5-hydroxyquinoxaline-1,4-dioxide | 35 |
| Commercial poultry mash | 365 | and is diluted with 1000 kg. of poultry mash to give a medicated foodstuff suitable for direct feeding to chickens to increase their rate of growth as compared with chickens fed on an unmedicated foodstuff.

The in vitro activity of the quinoxaline derivatives of the invention against various bacteria was measured by a standard serial dilution assay of the test compound in a nutrient broth inoculated with the bacteria, and the minimum inhibitory concentration was determined. The results obtained with a representative selection of the quinoxaline derivatives of the invention are given below.

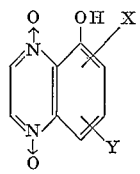

| | | Minimum inhibitory concentration in µg. per ml. against— | | | |
|---|---|---|---|---|---|
| X | Y | S. aureus | Sal. dublin | Pseudomonas aeruginosa | Proteus vulgaris |
| H | H | 1.9–6.2 | 3–15 | 7–25 | 3–7 |
| H | 8-OH | 6.25 | 12.5 | 50 | 6 |
| H | 8-OCH$_3$ | 4.0 | 4.0 | 62 | 4 |
| H | 8-NH.CO.CH$_3$ | 0.3 | 3.1 | 25 | 6.2 |
| H | 8-Cl | 0.3 | 0.7 | 6.2 | 1.5 |
| 6-Cl | H | 6.2 | 6.2 | 25 | 6.2 |
| 6-Cl | 8-Cl | 0.7 | 6.2 | 100 | 12.5 |

The in vivo antibacterial activity of the quinoxaline derivatives of the invention against a typical Gram-negative organism was measured by the procedure described by J. K. Landquist and A. R. Martin in "Antimicrobial Agents and Chemotherapy," 1964, p. 591, as follows:

An infection of *Salmonella dublin* was established in mice by intraperitoneal injection of suitable dilutions of the organism in a 2.5% solution of gastric mucin. All untreated mice died in 1–2 days. Treatment with the test compound was given orally from the time of infection twice daily at 50 mg./kg. for two days. The mice were observed for 7 days, and survivors were assumed to have a survival time of 8 days. The result of treatment was assessed by the "effect," i.e., the increase in mean survival time of treated animals over that of the control group.

The following results were obtained:

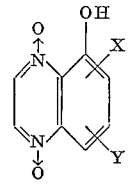

| X | Y | Effect in days |
|---|---|---|
| H | H | 4.9 |
| H | 8-OCH$_3$ | 5 |

It is evident from the above results that the quinoxaline derivatives of the invention show a high degree of potency against both Gram-positive and Gram-negative organisms.

A recommended dose for the treatment of Gram-negative infections in man is a dose of between 1 and 3 grams per man per day administered orally in divided doses. For this purpose, preferred formulations are tablets or capsules containing 250 mg. of active ingredient.

The growth promoting activity of the quinoxaline derivatives of the invention was measured by comparing the rate of increase in the body weights of a group of chickens fed on mash containing a quinoxaline derivative with that for a control group of chickens fed on unmedicated mash. A concentration of 0.01% of the quinoxaline derivative in the food was found to produce a substantial effect. A recommended dose for administration to domestic animals to promote their growth is between 10 and 100 gms. per ton of food, and preferably between 25 and 50 gms. per ton of food.

What I claim is:

1. A quinoxaline derivative selected from the group consisting of compounds of the formula:

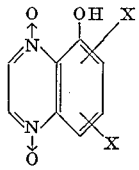

where X and Y are selected from the group consisting of hydrogen, halogen, hydroxy, alkoxy of 1–6 carbon atoms, alkylcarbonylamino and alkylsulphonylamino of 1 to 5 carbon atoms, and p-toluenesulphonylamino, and the sodium and potassium salts thereof.

2. A quinoxaline derivative as claimed in claim 1 wherein X is in position 6 of the quinoxaline nucleus and Y is in position 8 of the quinoxaline nucleus.

3. A quinoxaline derivative as claimed in claim 2 wherein X and Y are selected from hydrogen, chlorine, bromine, hydroxy, methoxy, acetylamino, methanesulphonylamino an p-toluenesulphonylamino.

4. A quinoxaline derivative as claimed in claim 1 selected from the group consisting of 5-hydroxy-, 5-hydroxy-8-methoxy-, 6,8-dibromo-5-hydroxy-, 8-chloro-5-hydroxy-, 6,8-dichloro-5-hydroxy-, 8-acetylamino-5-hydroxy-, 5,8-dihydroxy-, 5-hydroxy-8-p-toluenesulphonylamino- and 5-hydroxy-8-methanesulphonylaminoquinoxaline-1,4-dioxide, and the sodium and potassium salts thereof.

References Cited

Silk: Jour. Chem. Soc., pp. 2058–2063 (1956).

NICHOLAS S. RIZZO, Primary Examiner

U.S. Cl. X.R.

424—250